US005394519A

United States Patent [19]

Bodin

[11] Patent Number: 5,394,519

[45] Date of Patent: Feb. 28, 1995

[54] DATA PROCESSING APPARATUS FOR HIGH RESOLUTION DISPLAY IN MULTIPLE VIRTUAL DOS APPLICATIONS

[75] Inventor: William K. Bodin, Boca Raton, Fla.

[73] Assignee: International Business Machines Corp., Armonk, N.Y.

[21] Appl. No.: 176,589

[22] Filed: Jan. 3, 1994

[51] Int. Cl.[6] ............ G06F 15/62

[52] U.S. Cl. ............ 395/131; 395/162; 395/163; 395/164; 395/166; 345/150; 345/153

[58] Field of Search ............ 395/129–132, 395/162–166; 345/150, 153–155

[56] References Cited

U.S. PATENT DOCUMENTS 5,309,551 5/1994 Guttag et al. ............ 395/131

*Primary Examiner*—Almis Jankus

*Attorney, Agent, or Firm*—Bruce D. Jobse; Douglas R. McKechnie

[57] ABSTRACT

A color video system includes a palette data register for storing triplets of color data that control the colors of pixels. The triplets are stored at indexed locations accessed by an autoincrementing index register. When an application is switched from the foreground, one or more palette data register accesses are made until the index register is incremented, and a triplet pointer is set in accordance with the number of accesses, to point to the triplet member that was being accessed when the foreground switch occurred. When the application is switched back into the foreground, the value stored in the triplet pointer is used to point to the triplet member being accessed when the foreground switch occurred.

9 Claims, 3 Drawing Sheets

DATA PROCESSING APPARATUS FOR HIGH RESOLUTION DISPLAY IN MULTIPLE VIRTUAL DOS APPLICATIONS

BACKGROUND OF THE INVENTION

1. Field of the Invention

This invention relates to the field of data processing, and, more particularly, to an improved video system providing a high resolution display for multiple virtual DOS (disk operating system) application programs. More specifically, the invention involves an improved video device driver for operating palette registers in a video subsystem without trapping foreground accesses to such registers.

2. Description of Related Art

IBM PS/2 personal computers are based on the 80xxx family of microprocessors that operate bimodally in real and protected modes. Such computers run under operating systems such as the well known IBM DOS (disk operating system) and IBM OS/2 operating systems. (IBM, PS/2 and OS/2 are trademarks of International Business Machines Corporation) DOS was originally developed to run early personal computers that used microprocessors operable in only a real mode. OS/2 was developed to take full advantage of the protected mode of operation of the microprocessors while maintaining compatibility with DOS application programs.

In PS/2 architecture, system video can be generated by a video graphics array (VGA) and associated circuitry, which drives a color display by analog signals. The VGA and display form part of a video subsystem that also includes a video buffer for storing the data to be displayed, and a video digital-to-analog converter (DAC). A description of the VGA appears in the "Video Subsystem (type 1)" section of the "IBM PERSONAL SYSTEM/2 HARDWARE INTERFACE TECHNICAL REFERENCE" manual, published by IBM 1988. The DAC includes a group of registers known as the video DAC palette registers. These palette registers store digital palette data for controlling the RGB (red, green, blue) output of the converter and hence the color of each pixel on the display. The registers are located at predetermined port addresses and have the following names: palette address (write mode) register, palette address (read mode) register, DAC state register, Palette data register, and PEL mask register.

The two palette address registers each store an 8-bit address or index into the palette data register. The palette data register holds 256-sets of triplet (three bytes) RGB data. In each byte of palette data, the upper two bits are disregarded and the least significant, lower 6-bits represent color data. The 6-bits of color data from each of the three bytes at a given index, are concatenated to form 18-bits of color data that controls the color of a pixel. During read and write operations, a palette address is written into the appropriate one of the palette address registers and successive accesses to the palette data register automatically increment the address register that was loaded.

Commercially available OS/2, version 2.0 provides a virtual video device driver that is active in a virtual DOS machine environment. The driver requires trapping of accesses to the palette data registers. Trapping code in the virtual video device driver tracks accesses to such registers and maintains a triplet counter that points to the current triplet member of the palette data. This trapping is necessary since a screen-switch could occur at any moment during the execution of an application. When an application is switched to the background, the counter is used to virtualize DAC accesses by keeping track of which triplet is being updated. This is also the case when an application is windowed. A windowed screen is an emulation of a full screen session. An application does not have direct access to the video I/O ports when the application is windowed. Thus, the virtual video device driver traps access to the hardware and emulates.

SUMMARY OF THE INVENTION

There currently exists a great number of DOS applications which perform frequent I/O to the VGA video DAC registers. It is desirable to provide high performance through-put for these applications particularly when they are attempting to create special video effects by rapid DAC accesses. An example of a special video effect, is the use of the DAC to provide a fade-in or a fade-out effect.

One of the objects of the invention is to provide an improved video system for operating palette registers without trapping foreground accesses to such registers.

Another object of the invention is to provide improved apparatus for switching from and to foreground color displays in a video system having a palette register that contains triplets of palette data for controlling the color of pixels on the display.

A further object of the invention is to provide an improved video system for increasing the performance of foreground DOS applications, which run in a virtual DOS machine (VDM) and perform frequent I/O with the video DAC, by eliminating the need to trap foreground accesses to the palette data register in order to maintain a triplet counter.

Still another object of the invention is to provide improved apparatus for maintaining a triplet counter when a switch is made from a foreground mode, so that a return can be made to the one of the palette triplets being accessed at the time the foreground switch occurred.

Another object of the invention is to increase the performance of foreground DOS applications which run in a virtual DOS machine (VDM) and perform frequent I/O with the video DAC.

Briefly, in accordance with the invention, a color video system includes a palette data register for storing triplets of color data for controlling the colors of pixels. The triplets are stored at indexed locations accessed by an autoincrementing index register. When an application is switched from the foreground, one or more palette data register accesses are made until the index register is incremented, and a triplet pointer is set in accordance with the number of accesses, to point to the triplet member that was being accessed when the foreground switch occurred. When the application is switched back into the foreground, the value stored in the triplet pointer is used to point to the triplet member being accessed when the foreground switch occurred.

Other objects and advantages of the invention will be apparent from the following description taken in connection with the accompanying drawings wherein.

DESCRIPTION OF ILLUSTRATIVE EMBODIMENT

System Overview

Figure 1:
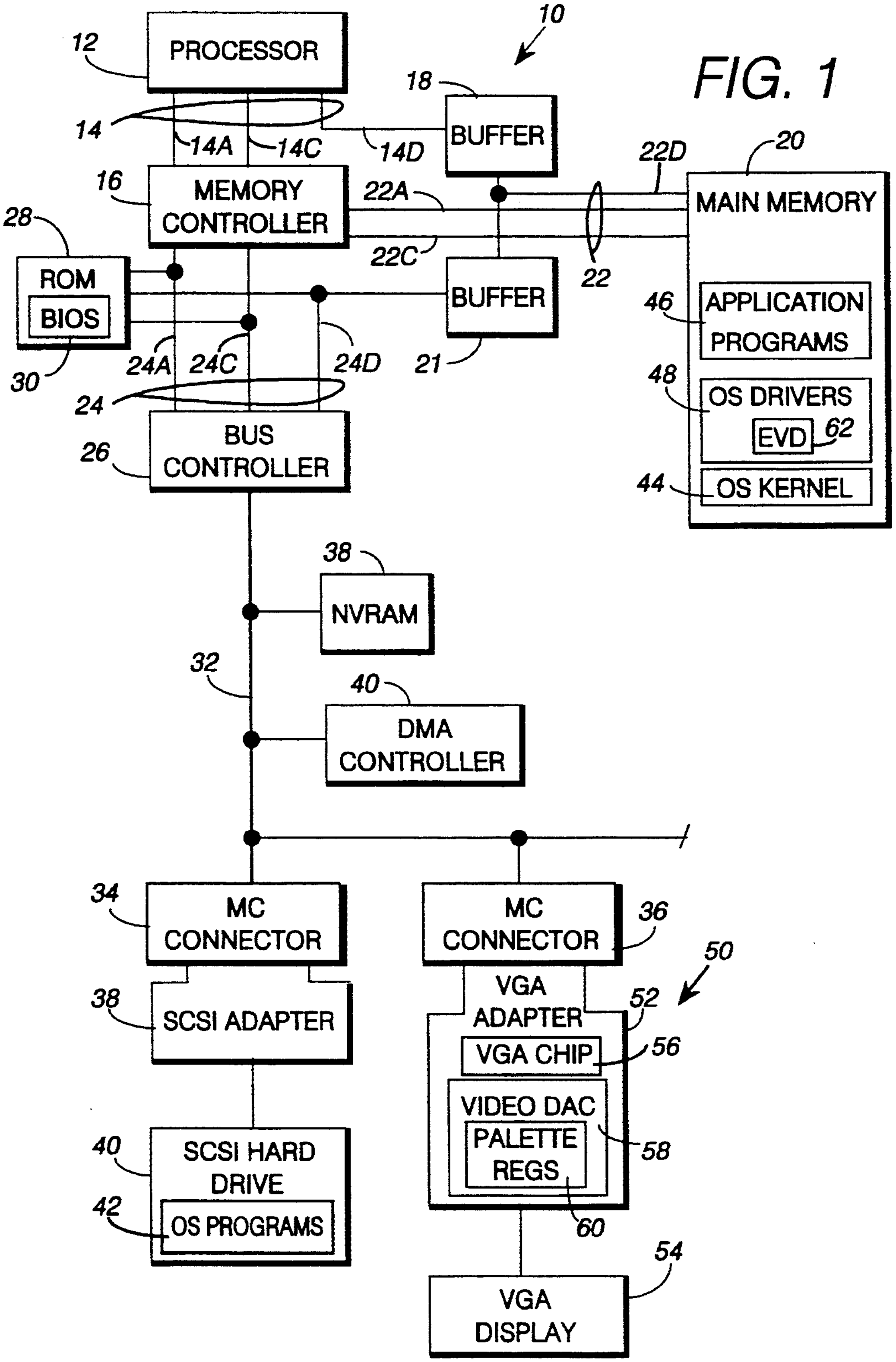
FIG. 1 is a block diagram of a data processing system embodying the invention.

Referring now to the drawings, and first to FIG. 1, the invention is embodied in a data processing system 10 such as an IBM Model 90 personal computer, running under an OS/2 version 2.0 operating system that is modified in accordance with the invention by the addition of an enhanced video driver described below. System 10 comprises a processor 12, such as an Intel 486 microprocessor, connected by a local bus 14 to one port of a memory controller 16 and to a data buffer 18. Bus 14 comprises a data bus 14D, an address bus 14A, and a control bus 14C. Memory controller 16 is a dual port controller for controlling access to a dynamic main memory 20 that provides volatile storage in random access memory (RAM). A memory bus 22 connects memory 20 to memory controller 16, to buffer 18, and to a data buffer 21. Bus 22 comprises a data bus 22D, a control bus 22C, and an address bus 22A.

The other port of memory controller 14 is connected by a bus 24 to a bus controller 26. Bus 24 is also connected to a read-only memory (ROM) 28 that stores a basic I/O operating system (BIOS) 30. Bus 24 comprises a data bus 24D, and address bus 24A, and a control bus 24C. Bus controller 24 acts as a interface between bus 24 and an expansion bus 32 that is constructed in accordance with the publicly known MicroChannel (MC) architecture. (MicroChannel is a trademark of International Business Machines Corporation) Bus 32 includes data, address, and control lines not separately referenced for simplicity of illustration. Bus 32 is further connected to a plurality of MC connectors 34 and 36, to a non-volatile RAM (NVRAM) 38, and to a direct memory access (DMA) controller 40. Connectors 34 and 36 provide the means by which additional devices can be coupled to the system.

A small computer system interface (SCSI) adapter 38 is plugged into connector 34, for attaching a SCSI hard drive 40. Drive 40 stores, in a non-volatile manner, a plurality of files including a plurality of OS programs 42 that form the operating system under which system runs. When the system is turned on, a standard power-on self test (POST) is performed. In response to the successful completion of such test, an OS kernel 44 is loaded into main memory 20 for execution by processor 12. Kernel controls execution of application programs 46 that are also loaded into memory 20 for execution by processor 12. A plurality of OS drivers 48 are also loaded into memory 20 for controlling access to various devices. Additional OS programs 42 are loaded into memory 20 for execution as needed.

A video sub-system 50 is coupled into system 10 and comprises a video graphics array (VGA) adapter 52 plugged into connector 36, for controlling access to a VGA display 54. VGA adapter 52 comprises a VGA chip 56, and a video DAC 58 containing a plurality of standard palette registers or regs 60. Application program access to display 54 is controlled by an enhanced video driver (EVD) 62, which is a modified or enhanced version of a standard OS driver. EVD 62 is described in detail below. Except for EVD 62, the remaining parts, of system 10, are well known, commercially available items, and the invention resides in how these otherwise old parts function in a new manner due to operation of EVD 62.

Enhanced Video Driver

Figure 2:
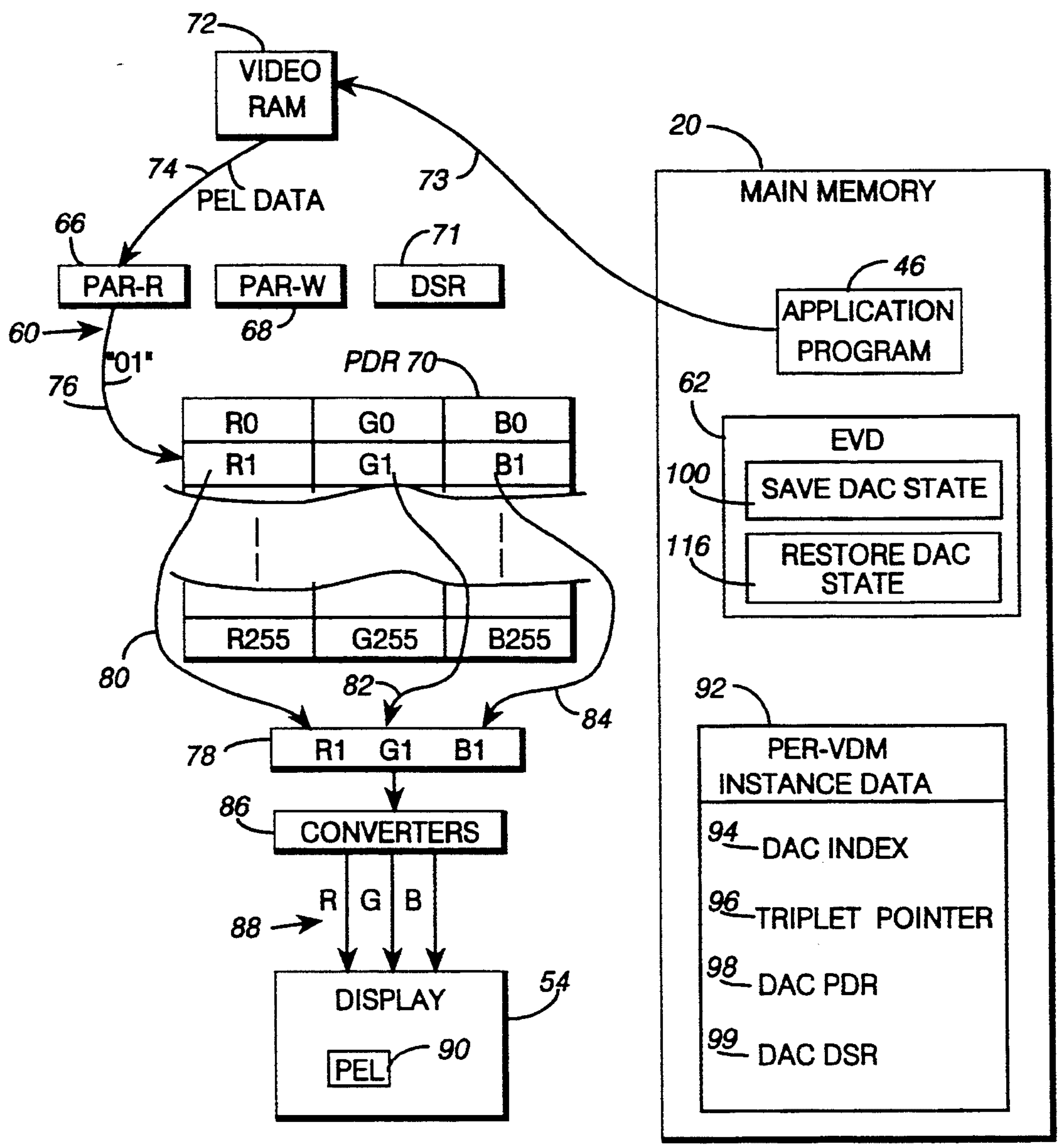
FIG. 2 is a schematic diagram of various data structures and routines, incorporated into the system shown in FIG. 1.

Before explaining the operation of EVD 62 in detail, it is useful to more fully understand the operation of the DAC palette address and data registers, and of other data structures or devices involved in the operation of EVD 62. With reference to FIG. 2, palette registers 60 comprise a palette address (write mode) register (PAR-W) 68, a palette address (read mode) register (PAR-R) 66, a palette data register (PDR) 70, and a DAC state register (DSR) 71. A standard PEL mask registers is not shown since it is not involved with the invention. The palette registers are accessed at predetermined I/O port addresses using standard IN and OUT instructions. Registers 66 and 68 each store a one byte (8-bits) address into PDR 70. Once the address is loaded, successive accesses to the PDR automatically increment the address register. PDR 70 is a table containing 256-entries, each entry being a triplet of three bytes respectively storing, in their lower six bits, digital values representing red, green, and blue values (RGB). PARs 66 and 68 store index values for addressing and accessing the various entries in PDR 70. DSR 71 is a read only register that is automatically set to indicate whether the last active DAC operation was a read operation or a write operation.

FIG. 2 illustrates the operations that occur for controlling the color of an individual PEL while an application program 46 is operating in the foreground. Prior to displaying any image, PDR 70 is filled with the palette color data representing the palette available to the application program. By step 73, application program 46 then stores image data in video RAM 72, the data representing the image to be displayed at a particular time. This image data is read from video RAM 72 in a continuous stream asynchronously to the operation of processor 12. For a given PEL, the PEL data is read at 74 from RAM 72 and placed in PAR-R 66, the PEL data including 8-bits that function as an index into PDR 70. The illustrated example assumes the PEL data is the hex value "01", which acts as an index to the second entry in PDR 70. The second entry contains three bytes for R1, G1, B1. When the index is placed in PAR-R 66, PDR 70 is automatically accessed to read the three bytes one-at-a-time from PDR 70 into an 18-bit register 78. The red data R1 is read at 80, the green data G1 is read at 82, and the blue data B1 is read at 84. The lower 6-bits of each byte are concatenated and stored in register 78. The values in register 78 are inputted into three internal converters 86 which convert the digital input data into three analog voltage signals 88 that drive analog display 54 to produce in PEL 90 the particular color defined by the PEL data.

Memory 20 also stores per-VDM instance data in a storage region 92 that is maintained for each DOS session and application. The instance data is saved when an application is switched from the foreground, which means in OS/2 terms, a full screen DOS session is either switched away from (using CTRL-ESC hot key) to place the application in background processing mode (in which the session is no longer visible) or making the full screen DOS session windowed (using ALT-HOME hotkey) and thus visible on the desktop as an emulated window. Region 92 comprises a DAC index counter register 94 for storing the index into PDR 70 that was being used at the time of the switching, a triplet pointer register 96 for storing a pointer to the triplet member that was being accessed at the time of switching, a DAC PDR 98 for storing the contents of PDR 70, and a DAC DSR 99 for storing the value in DSR 71 at the time of switching.

The purpose of saving the DAC state, or, more accurately deriving the DAC's current state when switching to the background, is that the invention eliminates the need for any trapping of the DAC index and data registers when the application session is in full screen mode in the foreground. When the application is placed in the background (or made windowed, these two states being equivalent for the purpose of the invention), the current DAC state is ascertained and register trapping is enabled until that session (application) becomes foreground at which time the process is essentially reversed by restoring the DAC state with the stored instance data and discontinuing trapping while the application operates in the foreground mode.

Figure 3:
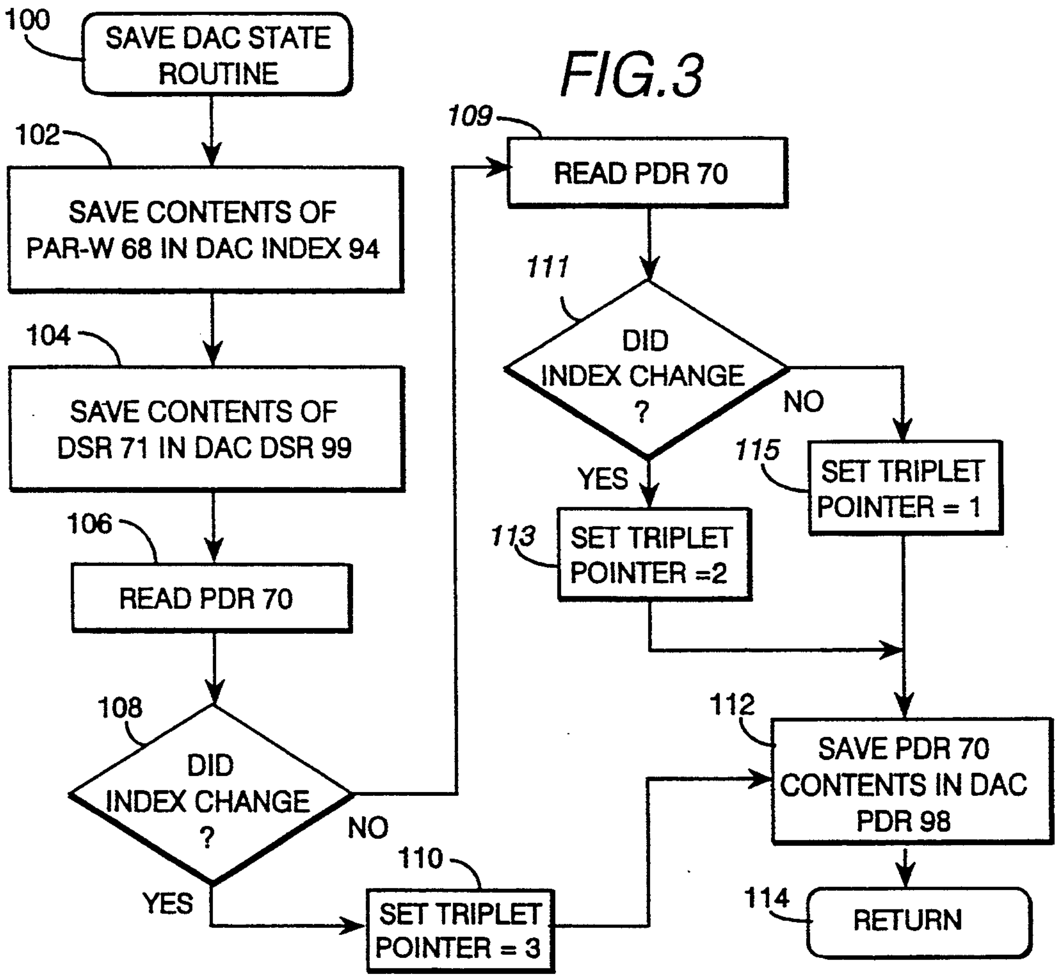
FIG. 3 is a flow chart of various functions performed by the apparatus shown in FIG. 1 and of steps performed in accordance with the method of the invention, for saving the DAC state.

EVD 62 dynamically derives the DAC state data from the DAC registers when a screen switch occurs so that it is unnecessary to hook the DAC registers when a VDM session is running in the foreground thus increasing foreground performance. EVD 62 comprises a Save DAC State routine 100 and a Restore DAC State routine 116. Routine 100 is called when a foreground DOS session is switched to background or windowed. With reference to FIG. 3, routine 100 operates as follows. Step 102 saves the contents of PAR-W 68 in DAC index register 94. Step 104 saves the contents of DSR 71 in DAC DSR 99. Then, PDR 70 is read in step 106. A comparison is made between the contents of register 68 with the value stored in DAC index register 94, to determine if the index in register 68 automatically incremented as a result of the PDR read operation. If the index changed, step 110 then sets the triplet pointer to a value of three indicating that the third triplet member was being accessed when the foreground switch occurred. Step 112 then saves the palette data from PDR 70 in DAC PDR 98. Step 114 returns control to the caller. If step 108 indicates that an index change did not occur, step 109 reads PDR 70 a second time. Step 111 determines if the index changed as a result of the second PDR read operation. If a change occurred, step 113 sets the triplet pointer to pointer to point to the second triplet member. If a change did not occur, step 115 sets the triplet pointer to point to the first triplet member. Steps 112 and 114 follow either of steps 113 or 115.

Figure 4:
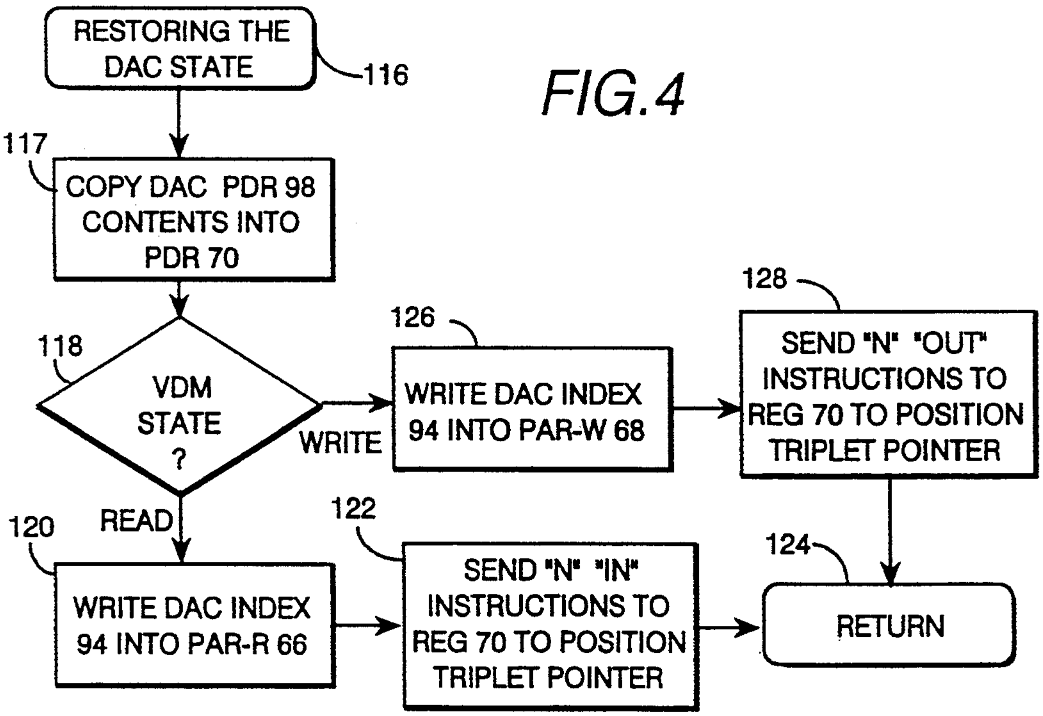
FIG. 4 is a flow chart similar to FIG. 3, for a restoring the DAC state.

With reference to FIG. 4, Restore DAC routine 116 operates as follows. Step 117 copies the contents of DAC PDR 98 into PDR 70 to restore the palette data register to the setting for the application. Step 118 looks at DAC DSR 99 to determine whether the VDM was in a read state or a write state. If it is a read state, step 120 writes the index from register 94 into PAR-R 66. Step 122 then sends a number "N" of IN instructions to PDR 70 to point to the triplet member that was being accessed when the original switch out of the foreground occurred. The number of instructions is the value of triplet pointer set by the DAC Save Routine 100, as described above. Then a return is made in 124. If step 118 determines the VDM state is a write state, step 126 writes the index from register 94 into PAR-W 68, and step 128 then sends a number of OUT instructions to PDR 70 to position the triplet pointer in accordance with the value previously stored in triplet pointer register 96. Then, a return is made in step 124. Once the DAC state has been restored, the application is switched to the foreground mode to continue processing therein.

As is obvious to those skilled in the art, the programs and data are stored as electrical signals. The term "processing means" as used in the claims encompasses not only the memories and storage devices which store the signals but also the different components, including the microprocessor, which operate in response to the stored signals, to carry out the different processing functions and operations described above.

It should be apparent to those skilled in the art that many changes can be made in the details and arrangements of steps and parts without departing from the scope of the invention as defined in the appended claims.

What is claimed is:

1. Data processing apparatus comprising:

a color video system comprising
- a color monitor having a plurality of pixels for displaying images,
- a video memory for storing digital data defining pixel colors from a pallet of colors,
- a video controller for selectively activating said pixels in accordance with the analog input signals, and
- a digital-to-analog converter (DAC) for converting digital data from said video memory into said analog input signals;

said DAC comprising a plurality of registers including a palette data register (PDR) having a plurality of indexed locations for storing triplet digital signals representing red, green, and blue (RGB) components for each color of said palette, said DAC further comprising two palette address registers (PARs) for storing indexes for respectively reading and writing information from and into said PDR, each of said PARs being automatically incremented to increment an index therein after accessing a triplet of said RGB signals;

first memory means for storing an operating system and an application program;

first processing means for running said application program under said operating system and switching said application between a foreground mode and a second mode, said application program being operative to present a full screen display on said monitor when running in said foreground mode;

second memory means used by said operating system for storing DAC state data associated with said application program, said second memory means comprising a DAC palette data register, a triplet pointer register, and a DAC index register; and second processing means for saving DAC state data in said second memory means in response to said operating system switching said application program from said foreground mode to said second mode, said second processing means comprising
- first means for writing palette data from said PDR into said DAC palette data register of said second memory means, second means for writing an index from one of said PARs into said DAC index register of said second memory means, and third means for generating and storing in said triplet pointer register a triplet pointer indicative of which triplet was being accessed in said PDR when said application was switched from said foreground mode.

2. Apparatus in accordance with claim 1 wherein said third means comprises fourth means for accessing said PDR until one of said PARs is incremented, and fifth means for setting said triplet pointer to a value dependent upon how many times said PDR is accessed by said fourth means.

3. Apparatus in accordance with claim 2 wherein said fifth means comprises means to set said triplet pointer to point to the third member of said triplet when said one PAR is incremented after one access, means for setting said triplet pointer to point to the second member of said triplet when said one PAR is incremented after two accesses, and means for setting said triplet pointer to point to the first member of said triplet when said one PAR is not incremented after two accesses.

4. Apparatus in accordance with claim 1 comprising:

third processing means for restoring said DAC state data in response to said application being switched back to foreground mode, said third processing means comprising sixth means for writing said palette data from said DAC palette data register into said PDR, seventh means for writing said index from said DAC index register into one of said PARs, and eighth means for accessing said PDR a number of times in accordance with said triplet pointer.

5. Apparatus in accordance with claim 4 wherein said DAC further comprises a DAC State Register (DSR) that is set to indicate whether a last active DAC operation was a Read operation or a Write operation; and said seventh means is operative to write said index into a first one of said PARS when said DSR indicates a Read operation and into the second one of said PARs when said DSR indicates a write operation.

6. Apparatus in accordance with claim 5 wherein:

said eighth means is operative to access said PDR by read accesses when said index is written into said one PAR and by write accesses when said index is written into said second one of said PARs.

7. Data processing apparatus comprising:

a color video system comprising a color monitor having a plurality of pixels for displaying images, a video memory for storing digital data defining pixel colors from a palette of colors, a video controller for selectively activating said pixels in accordance with analog input signals, and a digital-to-analog converter (DAC) for convening digital data from said video memory into said analog input signals;

said DAC comprising a plurality of registers accessible at I/O port addresses and including a palette data register (PDR) having a plurality of indexed locations for storing triplet bytes at each indexed location, said triplet bytes containing red, green, and blue (RGB) components for each color of said palette, said DAC further comprising two palette address registers (PARs) including a PAR-R register and a PAR-W register for storing indexes for respectively reading and writing information from and into said PDR, each of said PARs being automatically incremented to increment an index therein after accessing a triplet of said RGB signals;

first memory means for storing an operating system and an application program;

first processing means for running said application program under said operating system and switching said application between a foreground mode and a second mode, said application program being operative to present a full screen display on said monitor when running in said foreground mode;

second memory means used by said operating system for storing DAC state data associated with said application program, said second memory means comprising a DAC palette data register, a triplet pointer register, and a DAC index register;

second processing means for saving DAC state data in said second memory means in response to said operating system switching said application program from said foreground mode to said second mode, said second processing means comprising first means for writing palette data from said PDR into said DAC palette data register of said second memory means, second means for writing an index from one of said PARs into said DAC index register of said second memory means, and third means for generating and storing in said triplet pointer register a triplet pointer indicative of which triplet byte was being accessed in said PDR when said application was switched from said foreground mode, said third means comprising fourth means for accessing said PDR until said one PAR is incremented, and fifth means for setting said triplet pointer to a value dependent upon how many times said PDR is accessed by said fourth means;

said fifth means comprising means to set said triplet pointer to point to the third byte of said triplet when said one PAR is incremented after one access, means for setting said triplet pointer to point to the second byte of said triplet when said one PAR is incremented after two accesses, and means for setting said triplet pointer to point to the first byte of said triplet when said one PAR is not incremented after two accesses; and third processing means for restoring said DAC state data in response to said application being switched back to foreground mode, said third processing means comprising sixth means for writing said palette data from said DAC palette data register into said PDR, seventh means for writing said index from said DAC index register into one of said PARs, and eighth means for accessing said PDR a number of times in accordance with said triplet pointer.

8. Apparatus in accordance with claim 7 wherein said DAC further comprises a DAC State Register (DSR) that is set to indicate whether a last active DAC operation was a Read operation or a Write operation; and said seventh means is operative to write said index into a first one of said PARS when said DSR indicates a Read operation and into the second one of said PARs when said DSR indicates a write operation.

9. Apparatus in accordance with claim 8 wherein:

said eighth means is operative to access said PDR by read accesses when said index is written into said one PAR and by write accesses when said index is written into said second one of said PARs.

* * * * *